Patented Mar. 14, 1950

2,500,776

UNITED STATES PATENT OFFICE 2,500,776

METHOD OF REACTIVATING REDUCED METAL OXIDE CATALYSTS

John W. Teter, Chicago, Ill., assignor to Sinclair Refining Company, New York, N. Y., a corporation of Maine No Drawing. Application October 12, 1944, Serial No. 558,483

2 Claims. (Cl. 252—411)

This invention relates to improvements in the reactivation of catalysts used in the production of nitrogen-containing organic compounds by the direct amination of olefins with ammonia.

The production of nitrogen-containing products, largely nitriles and amines, by the direct catalytic reaction between ammonia and olefins, particularly propylene and ethylene, in the presence of a catalyst which selectively favors the amination reaction are described in applications Serial No. 289,186, filed August 9, 1939, abandoned, Serial No. 365,561, filed November 13, 1940, now U. S. Patent No. 2,381,470, Serial No. 444,094, filed May 22, 1942, now U. S. Patent No. 2,418,562, and Serial No. 464,636, filed November 5, 1942, now U. S. Patent No. 2,381,709.

In general, the process is carried out by bringing the olefin and ammonia into contact with a catalyst, e. g., a fixed bed catalyst, at high temperatures and pressures, for example, at temperatures of 450 to 750° F. and at high pressures, for example, 500 to 3000 lbs. pressure per square inch.

Catalysts which are useful in the process are the reduced metal oxides, such as nickel, and cobalt, particularly cobalt, deposited on a suitable carrier. Cobalt promoted by manganese deposited on a carrier such as diatomaceous earth, cobalt silicate, etc., is a particularly advantageous catalyst. Such catalysts are described in applications Serial Nos. 444,095, abandoned, 444,096, now U. S. Patent No. 2,406,929, and 444,097, now U. S. Patent No. 2,398,899, filed May 22, 1942, and Serial No. 489,087, filed May 29, 1943, now U. S. Patent No. 2,381,473.

The amination reaction is accompanied by side reactions, including cracking, dehydrogenation, polymerization, etc. In the course of the reaction heavy, tarry or carbonaceous materials are formed to some extent and a considerable proportion of such material as is formed is deposited on the catalyst. Whether because of this or for some other reason, the catalyst loses its activity after being on-stream for a considerable period, and requires reactivation. The present invention is directed to improvements in the reactivation operation which permit reactivation to be accomplished rapidly, so that the off-stream time required for reactivation is a minimum, and which result in a reactivated catalyst of activity comparable to a fresh catalyst and in a prolonged ultimate useful life of the catalyst.

In accordance with the present invention, the catalyst is reactivated by the use of hydrogen at high temperatures and pressures, and with purging of the catalyst with ammonia or an inert gas at the end of reactivation and before bringing the catalyst back on-stream.

The reactivation results in the substantial removal of the tarry or carbonaceous material which is deposited on the catalyst in the course of the amination reaction, apparently converting it to hydrocarbon, largely methane, and ammonia. The tarry or carbonaceous material which is deposited on the catalyst appears to consist largely of polymeric or high molecular nitrogen-containing compounds and the treatment with hydrogen at high pressures and high temperatures, in the presence of the catalyst, results in the hydrogenation or hydrogenolysis of this high molecular weight material with production of hydrocarbon, largely methane and ammonia. It should be noted that the ammonia produced is not the result of the simple release of adsorbed or otherwise physically bound ammonia, because purging of the catalyst with inert gases or the like does not result in the removal of this ammonia from the catalyst.

By the use of the present invention, a catalyst which has started to lose activity in the course of the direct amination reaction may be effectively reactivated in a relatively short period of time, for example, 6 hours or less, and through this rapid reactivation of the catalyst, it is possible to operate the amination process, with two reactors in parallel, substantially continuously with one reactor on-stream while the catalyst in the other is being reactivated.

The temperature at which the reactivation is carried out may be varied within substantial ranges, but advantageously, reactivation is carried out at about the temperature which is used in the amination reaction. This temperature may range, as pointed out above, about 450 to about 750° F. A very good temperature range for the amination of propylene appears to be about 640 to 650° F., and in such a procedure, reactivation can be advantageously carried out at about the same temperature. Somewhat lower temperatures than those used in the process may be used, because the reactivation is an exothermic reaction, apparently, as pointed out above, involving hydrogenation or hydrogenolysis.

Similarly, the pressure used in the hydrogenation can be varied over a considerable range. Thus it may be carried out at 1000 or 2000 lbs. pressure or higher. Lower pressures may be used. A pressure of about 3000 lbs. is advantageously used as it permits effective reactivation of the catalyst in the period of about 4 hours, that is, a period of exposure of the catalyst to the high pressure, high temperature hydrogen of about 4 hours, corresponding to a total period required for reactivation, including the times required for pressure reductions and purging, of about 6 hours or less. The use of such an interval for reactivation is advantageous, because it corresponds to an on-stream period during which the catalyst maintains high activity. While the catalyst can be used on-stream for considerably longer times than 6 hours and still give good yields of nitrogen-containing products, there is no great advantage in such long continued on-stream periods in view of the rapidity and effectiveness of the reactivation when carried out in accordance with this invention.

For example, in the production of nitrogen-containing products by the direct amination of propylene, using a cobalt catalyst of the type described in the applications previously referred to, the amination may be carried out at a pressure of about 1500 lbs. and a temperature of about 640 to 650° F., the gas mixture being preheated and then fed to the catalyst chamber. Frequently, after about 6 hours of operation, the catalyst activity shows signs of falling off, and the supply of reactants to the reactor is cut off. The reactor is then released to atmospheric pressure, taking such steps as are desirable to recover whatever materials of value are in the reactor, and hydrogen is introduced into the reactor to reactivate the catalyst. The hydrogen will be preheated to about 600 to 650° F. and introduced at that high temperature. As the reaction is exothermic, adiabatic conditions may be maintained in the reactor, that is, it is unnecessary to supply extraneous heat. The operations of reducing the initial pressure, introducing the hydrogen and building up to the hydrogen pressure, for example, to about 3000 lbs., may take about one hour. Hydrogen at the pressure of 3000 lbs. per square inch and a temperature of 600–650° F. is then passed slowly through the reactor for a period of about 4 hours. In the course of this time, reactivation of the catalyst is substantially completed, much or all of the tar or carbonaceous material being removed from the catalyst and converted to hydrocarbon and ammonia. At the end of this reactivation period, the hydrogen pressure in the reactor is released, and the reactor is purged with ammonia, to remove hydrogen and so prevent hydrogenation of the unsaturated portion of feed at the start of the on-stream period. After purging with ammonia, the reactor is brought back on-stream and the amination process proceeds. The time required for the release of the hydrogen pressure and the ammonia purging may be about ½ to ¾ hour. Instead of ammonia, inert gases, such as nitrogen or the like may be used to remove the hydrogen from the reactor. Ammonia is conveniently used because it is one of the reacting materials and because it is important whenever hydrocarbon is introduced into the reaction vessel at high temperatures, the ammonia be present to prevent cracking and formation of coke or the like which would impair the activity of the catalyst.

I claim:

1. In a process for reactivating a catalyst containing as its essential active ingredient a reduced oxide of a metal selected from the group consisting of cobalt and nickel, said catalyst carrying a nitrogen-containing tarry material deposited thereon during the reaction of ammonia with olefins in an operation wherein a mixture of ammonia and olefin is brought into contact with said reduced metal oxide catalyst at a temperature within the range of 450°–750° F. and at a pressure within the range 500–3000 pounds per square inch, the improvement which comprises passing hydrogen at a temperature approximating 450°–750° F. and at a pressure approximating 1000–3000 pounds per square inch in contact with said catalyst, whereby the tarry material is converted to volatilized hydrocarbon and ammonia and the catalyst is reactivated.

2. The process as in claim 1, in which, after reactivation and before being brought back on-stream, the catalyst is purged of hydrogen by passing ammonia over it.

JOHN W. TETER.

REFERENCES CITED

The following references are of record in the file of this patent:

UNITED STATES PATENTS

| Number | Name | Date |
|---|---|---|
| 1,121,860 | Moore | Dec. 22, 1914 |
| 1,210,367 | Reynolds | Dec. 26, 1916 |
| 1,320,039 | Ellis | Oct. 28, 1919 |
| 1,483,412 | Clancy | Feb. 12, 1924 |
| 1,489,497 | Larson | Apr. 8, 1924 |
| 2,225,782 | Ipatieff et al. | Dec. 24, 1940 |
| 2,238,726 | Feisst et al. | Apr. 15, 1941 |
| 2,289,731 | Roelen et al. | July 14, 1942 |
| 2,294,414 | Matuszak et al. | Sept. 1, 1942 |
| 2,360,787 | Murphree et al. | Oct. 17, 1944 |
| 2,386,032 | Campbell | Oct. 2, 1945 |
| 2,419,470 | Teter | Apr. 22, 1947 |